United States Patent [19]

Holcomb

[11] 3,865,134
[45] Feb. 11, 1975

[54] SANITARY VALVE
[75] Inventor: Donald E. Holcomb, Brooklyn Center, Minn.
[73] Assignee: The Cornelius Company, Golden Valley, Minn.
[22] Filed: Apr. 23, 1973
[21] Appl. No.: 353,770

[52] U.S. Cl................ 137/594, 251/9, 251/297
[51] Int. Cl............................................. F16k 7/06
[58] Field of Search................ 251/4, 62, 10, 297; 137/594; 417/474-477

[56] References Cited
UNITED STATES PATENTS

| 729,423 | 5/1903 | Scheiber et al. | 251/9 X |
|---|---|---|---|
| 2,332,157 | 10/1943 | Mapson | 417/475 X |
| 2,954,028 | 9/1960 | Smith | 251/8 X |
| 3,016,915 | 1/1962 | Moeller | 251/9 X |
| 3,299,904 | 1/1967 | Burke | 251/9 X |
| 3,411,534 | 11/1968 | Rose | 251/9 X |

Primary Examiner—Alan Cohan
Assistant Examiner—Richard Gerard
Attorney, Agent, or Firm—Hill, Gross, Simpson, Van Santen, Steadman, Chiara & Simpson

[57] ABSTRACT

A sanitary control valve, here constituting two valves sharing a common housing, includes a tube that is selectively radially compressed between a reaction surface on the housing and a movable cam surface disposed therein. The valve includes drag means which frictionally engage the cam, a series of teeth or serrations carried on one of the cam and housing for cooperation with means on the other of said cam and housing to provide discrete incremental positions of the cam. The knob has a pointer portion which overhangs a series of position indicia on the housing.

6 Claims, 3 Drawing Figures

PATENTED FEB 11 1975

3,865,134

3,865,134

SANITARY VALVE

BACKGROUND OF THE INVENTION

1. Field of the Invention

This invention relates to a sanitary valve of the type wherein a flexible tube is radially compressed.

2. Prior Art

Broadly speaking, pinch valves are known but are ordinarily used in a manner to be fully open or to be fully closed, such as in dispensing milk. Further, throttling valves have been used in the past in beverage mixing systems to regulate the proportion of ingredients used, such as in a beverage, but these have been provided with throttling valves that have discrete moving parts and seals therein.

SUMMARY OF THE INVENTION

In accordance with this invention, a sanitary valve is provided by which a radially collapsible tube can be accurately selectively compressed by a selected amount by means of a manually movable cam which will retain its setting at any position between full open and full closed, there being means to indicate a predetermined degree of throttling or openness and means by which the likelihood of accidental repositioning of the valve is minimized.

Accordingly, it is an object of the present invention to provide a throttling valve constructed as a sanitary valve.

Another object of the present invention is to provide a double sanitary valve for controlling two fluids independently of one another wherein certain structural components of the device are shared.

Another object of the present invention is to provide means for enabling discrete incremental positioning of the sanitary control valve for return to said positions.

A still further object of the present invention is to provide a sanitary control valve of the pinch-tube type wherein there is a frictional resistance against resetting thereof, both to accidental and intentional resetting.

Many other advantages, features and additional objects of the present invention will become manifest to those versed in the art upon making reference to the detailed description and the accompanying drawings in which a preferred structural embodiment incorporating the principles of the present invention is shown by way of illustrative example.

ON THE DRAWING

AS SHOWN ON THE DRAWING

Figure 1:
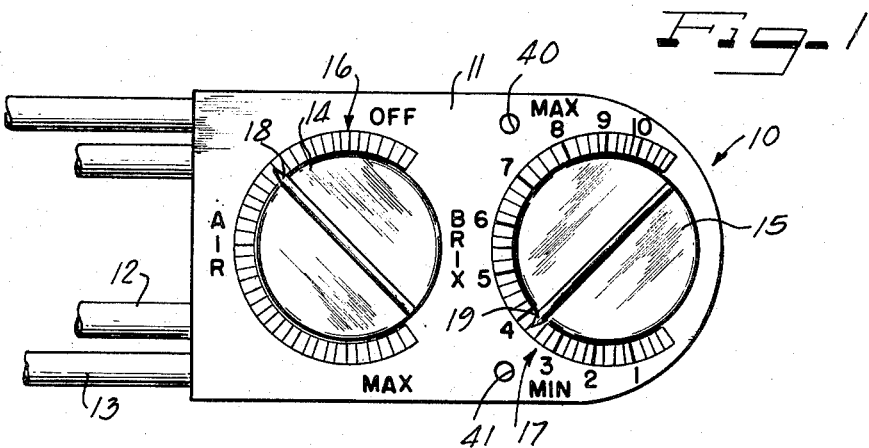
FIG. 1 is a front elevational view of a double sanitary control valve provided in accordance with the principles of the present invention.

The principles of the present invention are particularly useful when embodied in a sanitary control valve such as shown in FIG. 1, generally indicated by the numeral 10. The sanitary control valve 10 includes a housing 11, a radially resilient tube 12 such as for controlling air flow, a radially resilient tube 13 such as for controlling syrup or other beverage concentrate, and a pair of knobs 14,15 respectively controlling the fluid flow through the tubes 12,13. Suitable indicia 16,17 are associated with the knobs 14,15 and the position of such knobs is indicated by a pointer portion 18,19 of the knobs which is gripped for knob rotation, the pointer portions overhanging the position indicia 16,17.

Figure 2:
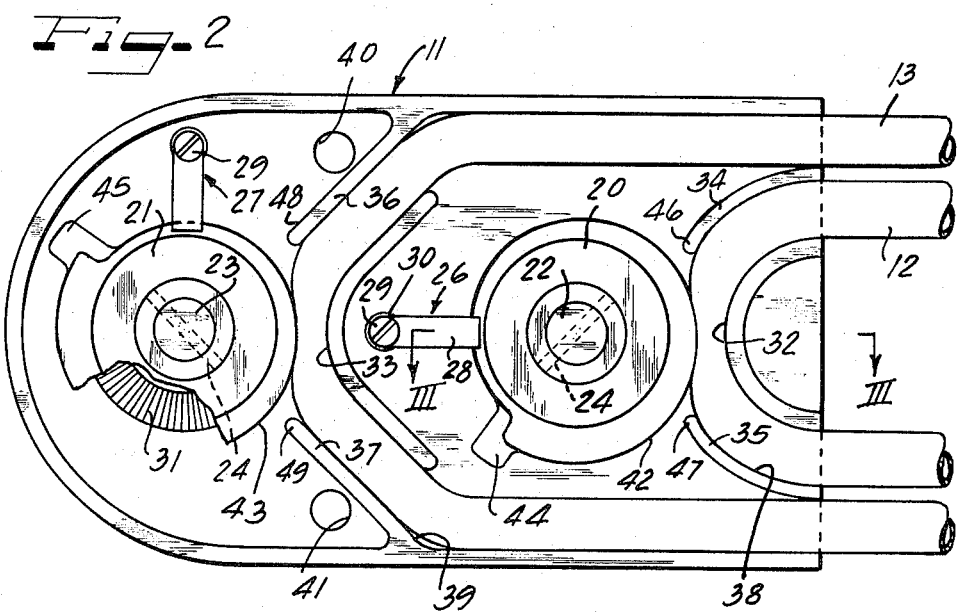
FIG. 2 is an enlarged rear elevational view of the valve of FIG. 1.
Figure 3:
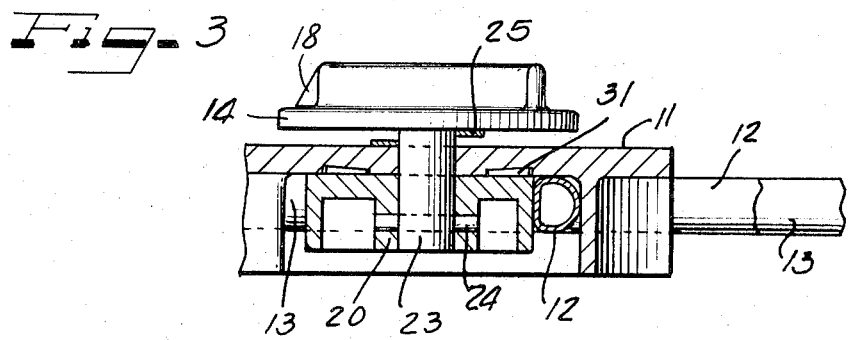
FIG. 3 is a fragmentary cross-sectional view taken substantially along the line III—III of FIG. 2.

As shown in enlarged form in FIG. 2, as viewed from the back of FIG. 1, the sanitary control valve 10 further includes a pair of cams 20,21 respectively associated with the knobs 14,15 by means of a pair of shafts 22,23 each having a pin 24 connecting the shafts 22,23 to the cams 20,21. As shown in FIG. 3, an annular compression spring 25 acts between the front face of the housing 11 and the back side of the associated knob 14 to draw the cam 20,21 axially against an inner surface of the housing 11 to provide friction therebetween. Such friction minimizes the likelihood of accidental movement of the knob and also minimizes the likelihood of spring-back toward the position from which the associated cam 20,21 was moved.

To further augment such friction, drag means 26,27 frictionally engage the cam at its periphery. The drag means 26,27 each comprise a blade 28 which has a degree of resiliency and which is mounted by a screw 29 on a threaded post 30 forming part of the housing 11.

A set of teeth 31 are provided on the housing 11 as shown in FIG. 2, and a complemental set of teeth or serrations are provided on the adjacent surface of the cam 20,21. The number of teeth is relatively large so that each tooth defines discrete incremental angular positions of the cams 20,21 and the spring 25 urges such teeth 31 to mesh with each other. As shown in FIG. 3, teeth on the cam 20 fit into the teeth 31 on the housing 11. This feature requires that closely spaced teeth be provided on one of the cam 20 and housing 11 coupled with means on the other of such cam and housing to fit between such teeth whereby the discrete incremental positions of the cam 20 are defined to enable precise repositioning of the cam 20.

The tubes 12,13 are radially resilient and are disposed against a reaction surface 32,33 carried on the housing 11, such reaction surfaces in this embodiment being convex. As shown, the tubes 12,13 are arranged in a U-shaped manner about the reaction surfaces 32,33, the U-shape of the tube 13 extending about the U-shape of the other tube 12. In this manner, both ends of both tubes pass through a single end of the housing 11.

The housing 11 additionally has a number of guide means 34–37 which with the reaction surfaces 32,33 and the inner surface of the housing 11 define a channel-like passage 38,39 for the tubes 12,13. The channel is closed on the side facing the viewer in FIG. 2 by the structure to which the valve 10 is mounted such as by means (not shown) extending through a pair of mounting holes 40,41.

The cams 20,21 are manually movable and are rotatable as explained above. Each has a camming surface 42,43 which are coactive with the reaction surfaces 32,33 for radially collapsing the tube by a selected amount which, in this embodiment can be total collapse of the internal passage (closed position) to no collapse at all (fully open position). The camming surfaces 42,43 are on the outer periphery of the cams 20,21. In order to limit cam travel, the cams 20,21 are provided with a stop 44,45 which in this embodiment moves in an arcuate path between a pair of abutments 46–47 and 48–49 respectively. Where this feature is included, there is at least one such abutment for the stop 44,45, and in the present embodiment, the abutments 46–49 comprise a surface of the guide means 34–37 that is directed away from the tube 12,13. It will be noted that the various structural components that guide the tubes 12,13 substantially enclose the tube 12,13 in the region where the same is engaged by the cam periphery 42,43. One end of the guide means 34,35 is common to and is thus shared by the passages 38,39.

Each of the cams 20,21 can be selectively positioned as desired to radially collapse the tubes 12,13 by the desired amount so as to produce the proper proportions of beverage ingredients in the system that this device forms a part of. For a given tube size, an appropriate cam rise can be selected so as to provide the degree of compression desired throughout the range of movement of the cams 20,21 permitted by the stops and abutments, and corresponding indications or calibrations can form a part of the indicia 16,17 as desired. The device is simple to manufacture, to assemble, to use and to maintain, and the liquid being controlled is exposed to nothing other than the interior of its tube.

Although various minor modifications may be suggested by those versed in the art, it should be understood that I wish to embody within the scope of the patent warranted hereon all such embodiments as reasonably and properly come within the scope of my contribution to the art.

I claim as my invention:

1. A sanitary control valve assembly comprising:
   a. a housing having a pair of internal spaced reaction surfaces directed in the same direction;
   b. a pair of radially resilient tubes each arranged in a U-shape and respectively arranged about said reaction surfaces, the one U-shape being disposed about the other U-shape; and
   c. a pair of manually rotatable cams carried by said housing, and each having a camming surface respectively coactive with one of said reaction surface for individually collapsing said tubes by a selected amount.

2. A valve assembly according to claim 1, comprising; guide means in said housing defining a pair of separate channel-like passages within which said tubes are respectively radially constrained, a portion of said guide means having oppositely directed surfaces respectively defining part of said separate passages.

3. A valve assembly according to claim 2 in which at least one of said cams has a radially extending stop engageable with abutment surfaces on oppositely disposed portions of said tube guide means to limit cam movement.

4. A valve assembly according to claim 1 which includes at least one series of teeth disposed within said housing and carried by one of said housing and one cam and engaged by means disposed within said housing and coactive with said teeth, and said means being carried by the other of said housing and said one cam, to define incremental positions for the associated cam.

5. A valve assembly according to claim 4 which includes a spring acting to urge the associated cam axially and thereby urge said coactive means into firm engagement with said teeth.

6. A valve assembly according to claim 1 including at least one resilient blade carried by and within said housing and being loaded against said one cam at its periphery.

* * * * *